(12) United States Patent
Dahl et al.

(10) Patent No.: US 9,185,540 B2
(45) Date of Patent: Nov. 10, 2015

(54) METHOD AND APPARATUS FOR USE IN A COMMUNICATIONS NETWORK

(75) Inventors: Jan Dahl, Älvsjö (SE); Ove Karlsson, Emmaboda (SE); Patrik Teppo, Bobäck (FI)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 110 days.

(21) Appl. No.: 13/698,036

(22) PCT Filed: May 17, 2010

(86) PCT No.: PCT/EP2010/056715
§ 371 (c)(1),
(2), (4) Date: Nov. 14, 2012

(87) PCT Pub. No.: WO2011/144235
PCT Pub. Date: Nov. 24, 2011

(65) Prior Publication Data
US 2013/0058260 A1     Mar. 7, 2013

(51) Int. Cl.
| | | |
|---|---|---|
| H04W 4/24 | (2009.01) | |
| H04L 12/14 | (2006.01) | |
| H04M 15/00 | (2006.01) | |

(52) U.S. Cl.
CPC ............ *H04W 4/24* (2013.01); *H04L 12/1403* (2013.01); *H04L 12/1467* (2013.01); *H04M 15/00* (2013.01); *H04M 15/57* (2013.01); *H04M 15/63* (2013.01); *H04M 15/64* (2013.01); *H04M 15/65* (2013.01); *H04M 2215/204* (2013.01)

(58) Field of Classification Search
CPC ....... H04W 4/24; H04M 15/57; H04M 15/64; H04M 15/63; H04M 15/65; H04M 15/00; H04M 2215/204; H04L 12/1467; H04L 12/1403
USPC ............. 370/259, 351, 389, 395.1, 395.2, 370/395.21, 395.3; 379/111, 114.01, 379/114.03; 455/403, 405, 406
See application file for complete search history.

(56) References Cited

U.S. PATENT DOCUMENTS

| | | |
|---|---|---|
| 2008/0195535 A1 | 8/2008 | Liu |
| 2011/0040663 A1* | 2/2011 | Cai et al. .................. 705/30 |
| 2012/0250585 A1* | 10/2012 | Seetharaman et al. ........ 370/259 |

OTHER PUBLICATIONS

3GPP. "Technical Specification Group Services and System Aspects; Telecommunication management; Charging management; IP Multimedia Subsystem (IMS) charging (Release 7)" 3GPP TS 32.260 v7.7.0 (Mar. 2010). 3GPP, Valbonne Sophia Antipolis, France.

*Primary Examiner* — Obaidul Hiuq
(74) *Attorney, Agent, or Firm* — Coats & Bennett, P.L.L.C.

(57) ABSTRACT

Apparatus configured to operate as a network element within an IMS to provide services to a subscriber. The apparatus comprises a receiver for receiving charging function information for the subscriber provided by a subscriber profile server, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function. The apparatus further comprises a processor for determining whether the IMS network element should send charging information for the subscriber to an offline charging function and whether the IMS network should send charging information for the subscriber to an online charging function and a transmitter for sending charging information to any of an offline charging function accordingly.

20 Claims, 6 Drawing Sheets

METHOD AND APPARATUS FOR USE IN A COMMUNICATIONS NETWORK

TECHNICAL FIELD

The present invention relates to a method and apparatus for use in a communications network. More particularly, the invention relates to a method of implementing charging in an IP Multimedia Subsystem.

BACKGROUND

IP Multimedia services provide a dynamic combination of voice, video, messaging, data, etc. within the same session. By growing the number of basic applications and the media which it is possible to combine, the number of services offered to the end users will grow, and the inter-personal communication experience will be enriched. This will lead to a new generation of personalised, rich multimedia communication services, including so-called "combinational IP Multimedia" services.

The IP Multimedia Subsystem (IMS) is an access independent architectural framework for supporting traditional telephony as well as the new IP multimedia services (3GPP TS 22.228, TS 23.228, TS 24.229, TS 29.228, TS 29.229, TS 29.328 and TS 29.329). IMS provides key features to enrich the end-user person-to-person communication experience through the use of standardised IMS Service Enablers, which facilitate new rich person-to-person (client-to-client) communication services as well as person-to-content (client-to-server) services over IP-based networks. The IMS is able to connect to both PSTN/ISDN (Public Switched Telephone Network/Integrated Services Digital Network) as well as the Internet.

The IMS makes use of the Session Initiation Protocol (SIP) to set up and control calls or sessions between user terminals (or terminals and application servers). The Session Description Protocol (SDP), carried by SIP signalling, is used to describe and negotiate the media components of the session. Whilst SIP was created as a user-to-user protocol, IMS allows operators and service providers to control user access to services and to charge users accordingly. The 3GPP has chosen SIP for signalling between a User Equipment (UE) and the IMS as well as between the components within the IMS.

By way of example, FIG. 1 illustrates schematically how the IMS fits into the mobile network architecture in the case of a GPRS/PS access network (IMS can of course operate over other access networks). Call/Session Control Functions (CSCFs) operate as SIP proxies within the IMS. The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF.

Within the IMS service network, Application Servers (ASs) are provided for implementing IMS service functionality. Application Servers provide services to end users in an IMS system, and may be connected either as end-points over the 3GPP defined Mr interface, or "linked in" by an S-CSCF over the 3GPP defined ISC interface. In the latter case, Initial Filter Criteria (IFC) are used by an S-CSCF to determine which Applications Servers should be "linked in" during a SIP Session establishment (or indeed for the purpose of any SIP method, session or non-session related). The IFCs are received by the S-CSCF from a Home Subscriber Server (HSS) during the IMS registration procedure as part of a user's Subscriber Profile.

The Home Subscriber Server (HSS) is the main database in the IMS for storage of subscriber profile information and service related data, including user identities, registration information, access parameters and the IFCs used to trigger services. The user identities consist of IP Multimedia Public Identities (IMPU) and IP Multimedia Private Identities (IMPI). The IMPU is the identity that other users can use in order to contact the user, whilst the IMPI is a user identity assigned by the user's network operator and that is used for registration and authorisation in the IMS. In order to participate in multimedia sessions, the user must register at least one IMPU with the network and an IMPI must be authenticated in the IMS at the application level. The private user identity and public user identities are stored in an IMS Services Identity Module (ISIM) application on a UMTS Integrated Circuit Card (UICC) at the user's terminal, and a particular IMPU may be simultaneously registered from multiple UEs that use different IMPIs and different contact addresses. The HSS also contains functionality of a Home Location Register and Authentication Centre (HLR/AUC) to provide support to packet-switched domain entities, such as the Serving GPRS Support Node (SGSN) and Gateway GPRS Support Node (GGSN), and to circuit switched domain entities, such as the Mobile Switching Centres (MSC).

A subscriber registers with the IMS using the specified SIP REGISTER method. This is a mechanism for attaching to the IMS and announcing to the IMS the address ("contact") at which a SIP subscriber identity can be reached. In 3GPP, when a SIP terminal performs a registration, the IMS authenticates the subscriber, and allocates an S-CSCF to that subscriber from the set of available S-CSCFs. Whilst the criteria for allocating S-CSCFs are not specified by 3GPP, these may include load sharing and service requirements. It is noted that the allocation of an S-CSCF is key to controlling (and charging for) subscriber access to IMS-based services. Operators may provide a mechanism for preventing direct subscriber-to-subscriber SIP sessions which would otherwise bypass the S-CSCF.

During the registration process, it is the responsibility of the I-CSCF to select an S-CSCF if an S-CSCF is not already selected. The I-CSCF receives the required S-CSCF capabilities from the home network's HSS, and selects an appropriate S-CSCF based on the received capabilities. [It is noted that S-CSCF allocation is also carried out for a subscriber by the I-CSCF in the case where the subscriber is called by another party, and the subscriber is not currently allocated an S-CSCF.] In the case where multiple HSSs are deployed in a network, a Subscription Locator Function (SLF) is used by the I-CSCF to identify the correct HSS for a subscriber. When a registered subscriber subsequently sends a session request to the IMS, the P-CSCF is able to forward the request to the selected S-CSCF based on information received from the S-CSCF during the registration process.

3GPP TS 32.260 defines the Offline and Online Charging description for the IP Multimedia Subsystem. For both Offline and Online charging, charging information for network resource usage is collected concurrently with that resource usage. In Offline charging this charging information does not affect, in real-time, the service rendered. However, in Online charging, authorization for the network resource usage must be obtained by the network prior to the actual resource usage.

FIG. 2 illustrates schematically the IMS offline charging architecture. In this architecture a Charging Trigger Function (CTF) generates offline charging events based on the observation of network resource usage. All IMS entities handling SIP signalling can be provided with CTF functionality. The CTF is the focal point for collecting the information pertaining to chargeable events within the network element, assembling this information into matching charging events, and sending these charging events towards the Charging Data Function (CDF). The Charging Data Function (CDF) receives charging events from the CTF via the Rf reference point. It then uses the information contained in the charging events to construct Charging Data Records (CDRs). The CDRs produced by the CDF are transferred to the Charging Gateway Function (CGF) via the Ga reference point. The CGF acts as a gateway between the 3GPP network and the Billing Domain (BD), and uses the Bx reference point for the transfer of CDR files to the BD. The BD typically comprises post-processing systems such as the operator's billing system or billing mediation device. The Charging Gateway Function's (CGF) main functionalities are in principle equivalent to those of the Charging Collection Function's (CCF) for IMS.

FIG. 3 illustrates schematically the IMS online charging architecture. In this architecture, when receiving a network resource usage request, a CTF assembles the relevant charging information (which is not necessarily identical to the charging information employed in offline charging) and generates an online charging event that is transferred to the to the Online Charging Function (OCF) within the Online Charging System (OCS) in real-time using the Ro reference point. The OCF then returns an appropriate resource usage authorization based on subscriber account information. This resource usage authorization may be limited in its scope (e.g. volume of data or duration), and may therefore have to be renewed from time to time as long as the subscriber's network resource usage persists. If required by the operator, CDRs may additionally be generated for online charged subscribers. The OCF includes the Session Based Charging Function (SBCF/SCF) and the Event Based Charging Function (EBCF/ECF). The SBCF is responsible for online charging of network/user sessions, e.g. voice calls, IP CAN bearers, IP CAN session or IMS sessions. The EBCF performs event-based online charging (often referred to as "content charging") in conjunction with any application server or service NE, including SIP application servers.

As illustrated in FIG. 3, only an AS, an MRFC or an S-CSCF support online charging. However, with regards to the S-CSCF, the S-CSCF does not trigger any online charging events. A special CTF is therefore needed in order to mediate between the Ro based SBCF and the SIP based service control implemented by the S-CSCF. This role is taken by the IMS Gateway Function (IMS-GWF), which translates between SIP service control towards the S-CSCF and Ro credit control on the OCS side. From the perspective of the online charging architecture, the IMS-GWF is an online charging capable CTF; whilst from the perspective of the S-CSCF the IMS-GWF is a SIP application server and is triggered in the same way. As such, the S-CSCF supports online charging using either the ISC interface (i.e. if the application server addressed over the ISC interface is IMS-GWF), or the Ro interface directly (if the IMS-GWF is integrated within the S-CSCF).

The addresses of the charging functions (i.e. CDF and/or OCS) are retrieved by the S-CSCF from a HSS via the Cx interface (e.g. when a subscriber registers with the IMS). These addresses are included within the Primary-Event-Charging-Function-Name, Secondary-Event-Charging-Function-Name, Primary-Charging-Collection-Function-Name, and Secondary-Charging-Collection-Function-Name AVPs of the Charging-Information AVP. The Charging-Information AVP can be included in the Server-Assignment-Answer (SAA) and Push-Profile-Request (PPR) Diameter messages sent by the HSS.

These charging function addresses are then distributed by the S-CSCF to the rest of the IMS network elements in the home network for one side of the session (either the calling or called side) using SIP signalling, and provide a common location for each entity to send charging information. In SIP, the offline and online charging function addresses are encoded in the P-Charging-Function-Addresses header as defined in RFC 3455. The P-Charging-Function-Addresses header field contains the "CCF" and "ECF" header field parameters. The "CCF" (i.e. Charging Collection Function) parameter includes the address for the CDF, whilst the "ECF" (i.e. Event Charging Function) parameter includes the address for the OCS.

There may be multiple CDF and OCS addresses populated into the P-Charging-Function-Addresses header field of the SIP request or response, although at least one instance of either the "CCF" or "ECF" header field parameters is required. If two "CCF" header field parameters are included, then the secondary "CCF" header field parameter is used by the network for redundancy purposes, and the first instance of "CCF" header field parameter is the primary address. Likewise, if two "ECF" header field parameters are included, then the secondary instance is only used for redundancy.

Those IMS network elements that only apply offline charging via the Rf interface (i.e. P-CSCF, I-CSCF, BGCF, IBCF, and MGCF) will use the CDF address as received via SIP signalling. Those IMS network elements that can apply offline charging and online charging (i.e. the S-CSCF, AS and the MRFC) are able to distinguish whether to apply offline or online charging, or whether to use both, based on the charging function address information they receive in the SIP signalling. If any of the S-CSCF, AS and MRFC only receive the CDF address, and do not receive an OCS address, then they use only the Rf interface. If only the OCS address is provided then they use only the Ro interface. In cases where both CDF and OCS addresses are provided it is possible to use both interfaces simultaneously. In addition, operators can configure the IMS network elements to overrule the addresses received via the SIP signalling, and use a locally configured OCS and/or CDF address. The choice of whether the IMS network elements use locally configured addresses or the addresses received by SIP signalling is left for operator configuration.

SUMMARY

It is an object of the present invention to provide a mechanism for providing individual instructions to each of the IMS network elements that provide charging information as to the charging policy that they should apply for a particular subscriber.

According to a first aspect of the present invention there is provided an apparatus configured to operate as a network element within an IMS to provide services to a subscriber. The apparatus comprises a receiver for receiving charging function information for the subscriber provided by a subscriber profile server, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function. The apparatus further comprises a processor for determining whether the IMS network element should send charging information for the subscriber to an offline charging function and whether the IMS network should send charging information for the subscriber to an online charging function and a transmitter for sending charging information to any of an offline charging function and an online charging function accordingly.

The IMS network element may be a S-CSCF and the receiver may be configured to receive the charging function information for the subscriber from the subscriber profile server. The processor may be further configured to generate messages distributing the charging function information to the other IMS network elements providing services to the subscriber; and the transmitter may be further configured for sending the messages to the other IMS network elements providing services to the subscriber.

Alternatively, the receiver may be configured to receive the charging function information for the subscriber from a S-CSCF.

According to a second aspect of the present invention there is provided a method of operating a network element within an IMS to provide services to a subscriber. The method comprises receiving charging function information for the subscriber provided by a subscriber profile server, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function, determining whether the IMS network element should send charging information for the subscriber to an offline charging function and whether the IMS network should send charging information for the subscriber to an online charging function, and sending charging information to any of an offline charging function and an online charging function accordingly.

The IMS network element may be a S-CSCF, and the charging function information for the subscriber may be received from the subscriber profile server. The IMS network element may generate messages distributing the charging function information to the other IMS network elements providing services to the subscriber, and send the messages to the other IMS network elements.

Alternatively, the charging function information for the subscriber may be received from a S-CSCF.

The charging function information may comprise one or more addresses of an offline charging function and one or more addresses of an online charging function, and, for each type of IMS network element, an indication as to which of the addresses an IMS network element of that type should use to send charging information for the subscriber.

The one or more addresses of an offline charging function and one or more addresses of an online charging function may be included within a plurality of charging function profiles, and the charging function information may further comprise, for each type of IMS network element, an identification of the charging function profile that should be applied by an IMS network element of that type.

According to a third aspect of the present invention there is provided an apparatus configured to operate as a S-CSCF within an IMS. The apparatus comprises a receiver for receiving charging function information for a subscriber, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function. The apparatus further comprises a processor for generating messages distributing the charging function information to the IMS network elements providing services to the subscriber, and a transmitter for sending the messages to the IMS network elements providing services to the subscriber.

The processor may be further configured to determine, for each IMS network element being used by the subscriber, whether that type of IMS network element should send charging information for the subscriber to an offline charging function and whether that type of IMS network element should send charging information for the subscriber to an online charging function, and to generate the messages to the IMS network elements accordingly.

According to a fourth aspect of the present invention there is provided a method of operating a S-CSCF within an IMS. The method comprises receiving charging function information for a subscriber, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function, generating messages distributing the charging function information to the IMS network elements providing services to the subscriber, and sending the messages to the IMS network elements providing services to the subscriber.

The charging function information may be received by the S-CSCF in the Charging-Information AVP of a Diameter message. The messages distributing the charging function information may be SIP messages, and the charging function information applicable to an IMS network element for the subscriber may be included within the P-Charging-Function-Addresses header field.

The step of distributing the charging function information to the IMS network elements may further comprise sending the charging function information to each of the IMS network elements being used by the subscriber. Alternatively, the step of distributing the charging function information to the IMS network elements may further comprise determining, for each IMS network element being used by the subscriber, whether that type of IMS network element should send charging information for the subscriber to an offline charging function and whether that type of IMS network element should send charging information for the subscriber to an online charging function, and for generating the messages to the IMS network elements accordingly.

The charging function information may comprise one or more addresses of an offline charging function and one or more addresses of an online charging function, and for each type of IMS network element, an indication as to which of the addresses the IMS network element should use to send charging information for the subscriber.

The one or more addresses of an offline charging function and one or more addresses of an online charging function may be included within a plurality of charging function profiles, and the charging function information may further comprise, for each type of IMS network element, an identification of the charging function profile that should be applied by an IMS network element of that type for the subscriber.

The step of generating the messages to the IMS network element accordingly may comprise:
- if it is determined that an IMS network element of that type should send charging information to both an offline charging function and an online charging function, sending the addresses of both the offline charging function and the online charging function to the IMS network element;
- if it is determined that an IMS network element of that type should send charging information to either an offline charging function or an online charging function, sending the addresses of the offline charging function or online charging function to the IMS network element; and
- if it is determined that an IMS network element of that type should not send charging information to an offline charging function nor to an online charging function, not sending the addresses of the offline charging function or online charging function to the IMS network element.

According to a fifth aspect of the present invention there is provided an apparatus configured to operate as a subscriber profile server within an IMS. The apparatus comprises a database configured with subscriber profiles each of which includes charging function information for the subscriber, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function, and a transmitter for sending the charging function information of a subscriber to a S-CSCF allocated to the subscriber. The subscriber profile server may be a Home Subscriber Server.

The apparatus may further comprise a receiver for receiving a notification of the registration of a subscriber from the S-CSCF, and a processor for retrieving the subscriber's charging function information from the database.

According to a sixth aspect of the present invention there is provided a method of operating a subscriber profile server within an IMS. The method comprises configuring the subscriber profile server with subscriber profiles each of which includes charging function information for the subscriber, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function, and sending this charging function information for a subscriber to a S-CSCF allocated to the subscriber. The subscriber profile server may be a Home Subscriber Server.

The subscriber's charging function information may be sent to the S-CSCF in response to receipt of a notification of the registration of the subscriber from the S-CSCF.

According to another aspect of the present invention there is provided a method of implementing charging in an IMS network. The method comprises configuring a subscriber profile server with subscriber profiles each of which includes charging function information for the subscriber, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function, and sending this charging function information for a subscriber to a S-CSCF providing services to a subscriber.

The IMS network elements may comprise any of:
- a Proxy Call Session Control Function, P-CSCF;
- an Interrogating Call Session Control Function, I-CSCF;
- a Serving Call Session Control Function, S-CSCF;
- an Application Server, AS;
- a Media Resource Function Controller, MRFC;
- a Media Gateway Control Function, MGCF;
- a Border Gateway Control Function, BGCF;
- an Interconnection Border Control Function, IBCF; and
- an IMS Gateway Function, IMS-GWF.

According to another aspect of the present invention there is provided a method of operating a subscriber profile server within an IMS. The method comprises configuring the subscriber profile server with subscriber profiles each of which includes charging function information for the subscriber, the charging function information comprising a plurality of charging function profiles, each charging function profile including one or more addresses of an offline charging function and/or one or more addresses of an online charging function, and sending this charging function information for a subscriber to a S-CSCF allocated to the subscriber. The subscriber profile server may be a Home Subscriber Server.

According to an additional aspect of the present invention there is provided a method of operating a S-CSCF within an IMS. The method comprises receiving charging function information for a subscriber, the charging function information comprising a plurality of charging function profiles, each charging function profile including one or more addresses of an offline charging function and/or one or more addresses of an online charging function, sending the charging function profiles to the IMS network elements providing services to the subscriber. The charging function information may be received by the S-CSCF in the Charging-Information AVP of a Diameter message. The charging function profiles may be included within the P-Charging-Function-Addresses header field of a SIP message sent to the IMS network elements.

According to a further aspect of the present invention there is provided a method of operating a network element within an IMS to provide services to a subscriber. The method comprises configuring the IMS network element with an identifier for a charging function profile that should be applied by the IMS network element, receiving charging function information for the subscriber provided by a subscriber profile server, the charging function information comprising a plurality of charging function profiles, each charging function profile including one or more addresses of an offline charging function and/or one or more addresses of an online charging function, identifying the charging function profile that should be applied for the subscriber and, from the charging function profile, determining whether the IMS network element should send charging information for the subscriber to an offline charging function and whether the IMS network should send charging information for the subscriber to an online charging function, and sending charging information to any of an offline charging function and an online charging function accordingly.

According to a further aspect of the present invention there is provided a computer program comprising computer program code means adapted to perform the following steps:

receive charging function information for a subscriber provided by a subscriber profile server, the charging function information including an indication of a plurality of IMS network element types that may be used to provide services to the subscriber and, for each of a plurality of IMS network element types, specifying whether an IMS network element of that type should send charging information for the subscriber to an offline charging function and whether an IMS network of that type should send charging information for the subscriber to an online charging function;

determine whether an IMS network element should send charging information for the subscriber to an offline charging function and whether the IMS network should send charging information for the subscriber to an online charging function; and send charging information to any of an offline charging function and an online charging function accordingly.

According to a further aspect of the present invention there is provided a computer program comprising computer program code means adapted to perform the following steps:

receive charging function information for a subscriber, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function;

generate messages distributing the charging function information to the IMS network elements providing services to the subscriber; and send the messages to the IMS network elements providing services to the subscriber.

According to a further aspect of the present invention there is provided a computer program comprising computer program code means adapted to perform the following steps:

configure a subscriber profile server with subscriber profiles each of which includes charging function information for the subscriber, the charging function information including an indication of a plurality of IMS network element types that may be used to provide services to the subscriber and, for each of the plurality of IMS network element types, specifying whether an IMS network element of that type should send charging information for the subscriber to an offline charging function and whether an IMS network of that type should send charging information for the subscriber to an online charging function; and send this charging function information for a subscriber to a Serving Call Session Control Function, S-CSCF, allocated to the subscriber.

According to a yet further aspect of the present invention there is a computer program as outlined above embodied on a computer readable medium.

DETAILED DESCRIPTION

Figure 1:
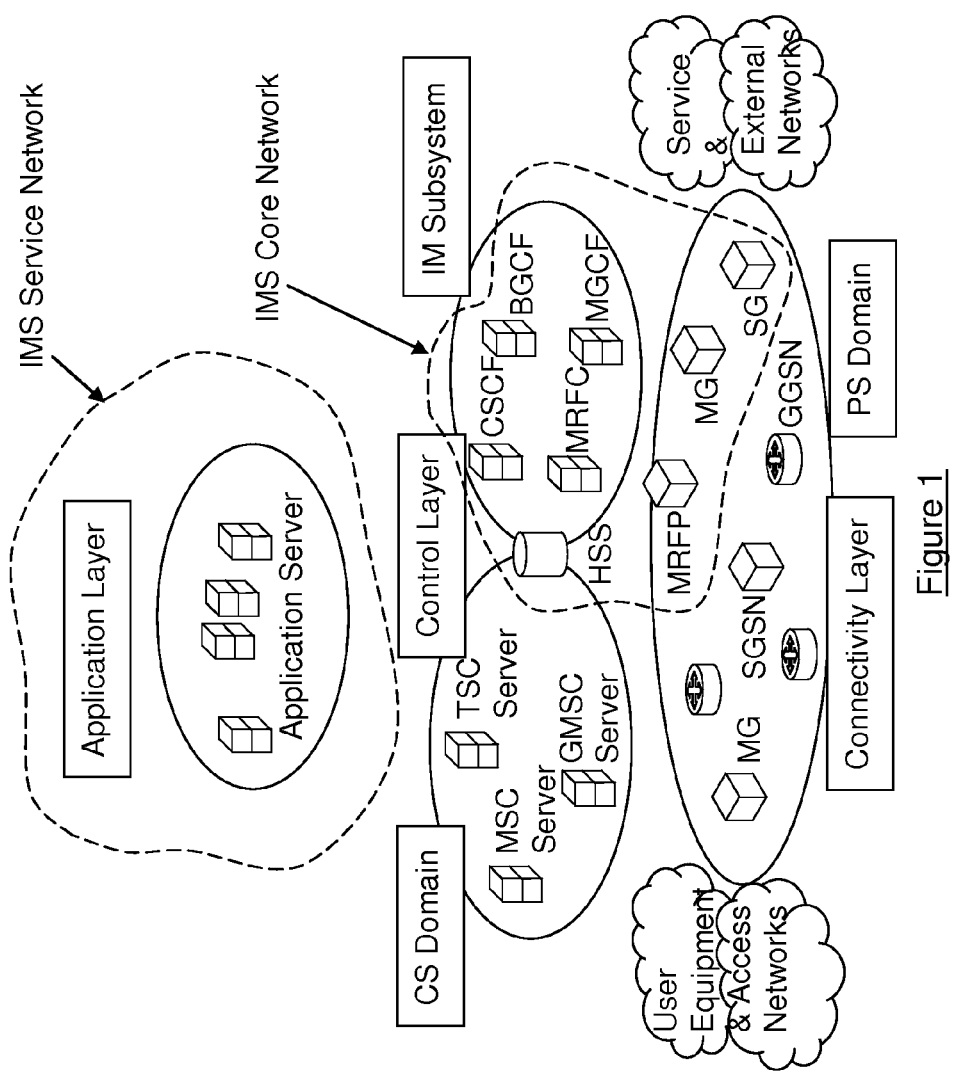
FIG. 1 illustrates schematically the mobile network architecture of a GPRS/PS access network.
Figure 2:
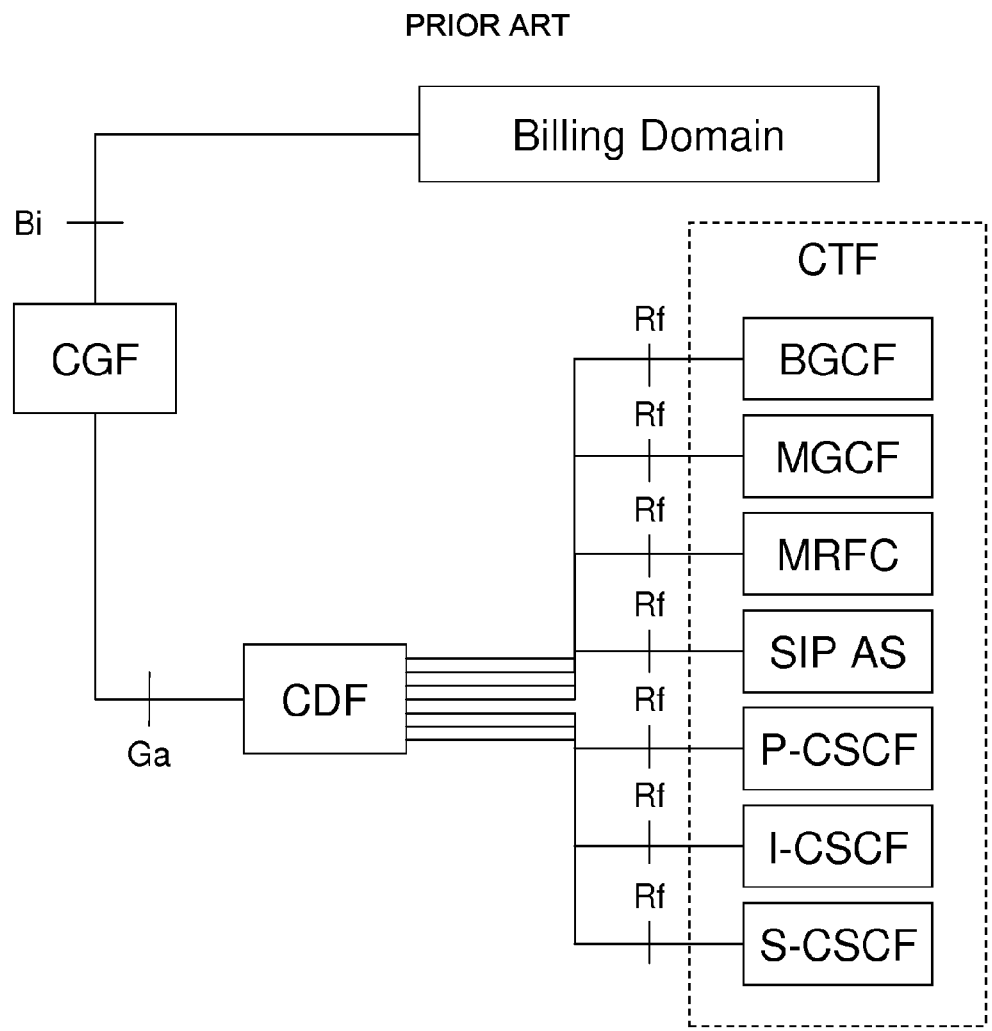
FIG. 2 illustrates schematically the offline charging architecture of the IP Multimedia Subsystem.
Figure 3:
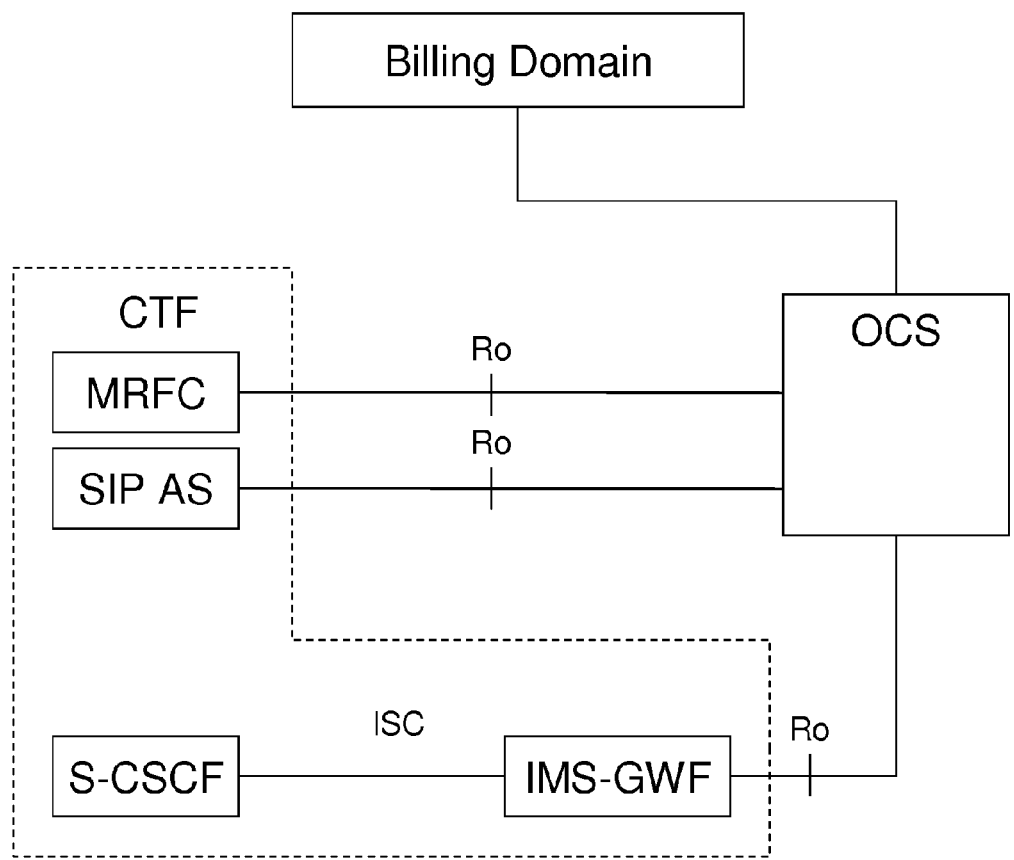
FIG. 3 illustrates schematically the online charging architecture of the IP Multimedia Subsystem.

It has been recognised here that, according to the existing 3GPP standards, it is not possible to provide individual instructions to each of the IMS network elements that provide charging information (i.e. that act as a CTF) as to the charging policy that they should apply for a particular user. For example, it is not possible to define that, for a particular subscriber, the S-CSCF should apply only online charging whilst the MGCF applies only offline charging. Whilst network operators can locally configure each of these network elements to apply a particular charging policy, this locally configured charging policy will be applied to all users. As such, when the IMS network elements receive the addresses of the charging functions, they then use these locally configured rules to determine whether or not they should send charging information over the Rf interface, the Ro interface, or over both the Rf and Ro interfaces.

In order to overcome, or at least mitigate the problems identified above, there will now be described a method of establishing charging in an IP Multimedia Subsystem. It is proposed here to extend the existing charging function information included within each of the subscriber profiles stored in and provided by HSS, to define the charging policy that is to be applied by each of the IMS network elements for a particular subscriber. For example, as well as providing the address(es) of the online and offline charging functions, the charging function information included in the subscriber profiles could additionally include an indication of the types of IMS network element that may be used to provide services to the subscriber and, for each type of IMS network element, an indication as to whether an IMS network element of that type should send charging information for the subscriber to an offline charging function and as to whether an IMS network of that type should send charging information for the subscriber to an online charging function.

Table 1 below illustrates an example of the additional information that could be included with the addresses of the charging functions. In this example, the subscriber profile defines that online charging should be applied in the S-CSCF and the AS, as these are the two main network elements of the IMS for end user charging. The subscriber profile also defines that the P-CSCF, MGCF, BGCF and IBCF should apply offline charging, as these IMS network elements handle interconnect and roaming traffic. Of course, this is just an example, and any viable combination can be defined for a particular subscriber. For example, any of the S-CSCF, AS or MRFC can apply one or both of online charging and offline charging.

As noted above, according to the standards, the addresses of the charging functions are retrieved by the S-CSCF from a HSS via the Cx interface, and are included within the Charging-Information AVP. The HSS would therefore be configured to store the extended/additional charging function information of each subscriber within the subscriber's profile, and to provide this additional charging function information to an S-CSCF that has been allocated to the subscriber. This additional charging function information would be provided to the S-CSCF in an extended Charging-Information AVP, which would be included within a SAA message, sent in response to receipt of a Server-Assignment-Request (SAR) message, or within a PPR message.

Upon receipt of a message from the HSS including the additional charging function information for the subscriber, the S-CSCF would be configured to process this message in order to determine the charging policy that each type of IMS network element should be applying. The S-CSCF would then notify each of the IMS network elements providing services to the subscriber in accordance with the charging function information. For example, for those network elements that are to apply only offline charging, the S-CSCF will only provide the address(es) of the offline charging function in the header value of the P-Charging-Function-Addresses header field. For those network elements that are to apply only online charging, the S-CSCF will only provide the address(es) of the online charging function. For those network elements that are to apply both offline and online charging, the S-CSCF will provide the address(es) of the offline and online charging functions. For those network elements that are not required to provide any charging information, the S-CSCF may not provide any charging function information. However, in some circumstances it may be necessary to provide charging function information to a network element that is not required to provide any charging information, such that that network element can forward that charging function information to another network element.

Alternatively, the S-CSCF can be configured to include all of the subscriber's charging function information, received from the HSS, in the P-Charging-Function-Addresses header field of the messages sent to the IMS network elements involved in charging. Each of the IMS network elements providing services to the subscriber would then be configured to process this information to determine whether they should be sending charging information to the online charging function and whether they should be sending charging information to the offline charging function, and the applicable address or addresses.

In addition, the IFC's received from a Home Subscriber Server (HSS) during the IMS registration procedure as part of a user's Subscriber Profile could contain an indication as to whether a particular application server that is to provide services to the subscriber can or cannot process the additional charging function information. The S-CSCF could then be configured to process the additional charging function information accordingly. For example, if the S-CSCF determined that the IFC's included an indication that an AS cannot process the additional charging function information, then the S-CSCF would be configured to process the additional charging function information in order to determine the charging policy that should be applied by that AS and to notify the AS accordingly. Alternatively, if the S-CSCF determined that the IFC's included an indication that an AS can process the additional charging function information, then the S-CSCF could be configured to simply forward the subscriber's charging function information to the AS, including all of the additional charging function information, such that the AS can process the additional charging function information in order to determine the charging policy that it should be apply.

Figure 4:
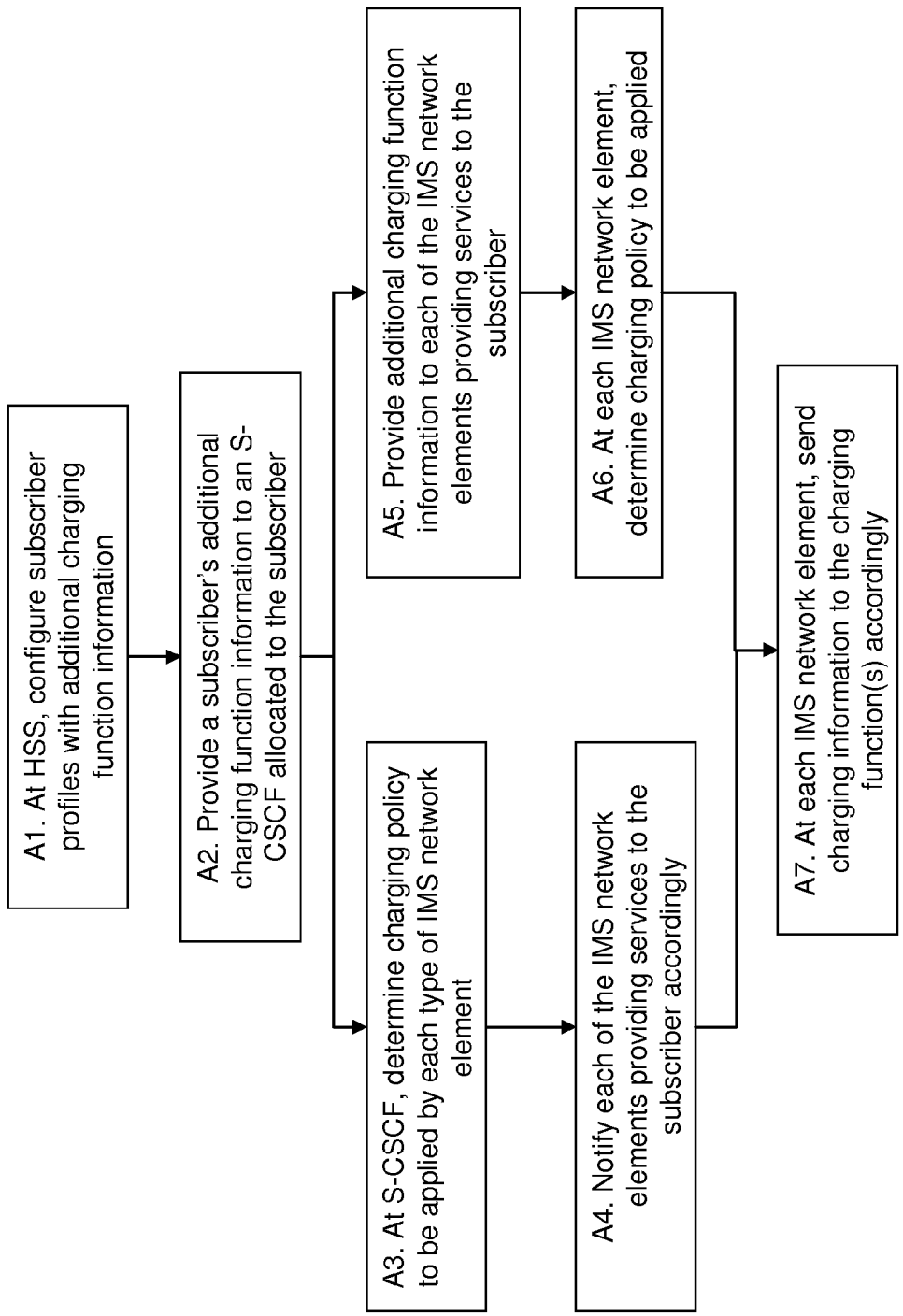
FIG. 4 is a flow diagram showing a procedure for implementing charging for a subscriber within an IP Multimedia Subsystem.

FIG. 4 is a flow diagram showing a procedure for implementing charging for a subscriber within an IP Multimedia Subsystem. The steps performed are as follows:

A1. The HSS is configured with the extended/additional charging function information of each subscriber within the subscriber profiles.

A2. This additional charging function information is then provided to an S-CSCF that has been allocated to a subscriber. For example, a subscriber's charging function information may be sent to the S-CSCF in response to receipt of a notification of the registration of the subscriber from the S-CSCF.

A3. Upon receipt of a message from the HSS including the additional charging function information for the subscriber, the S-CSCF could be configured to process this message in order to determine the charging policy that each type of IMS network element should be applying.

A4. The S-CSCF then notifies each of the IMS network elements providing services to the subscriber in accordance with the charging function information.

A5. Alternatively, the S-CSCF could be configured to include all of the subscriber's charging function information, received from the HSS, in the messages sent to the IMS network elements involved in charging.

A6. Each of the IMS network elements providing services to the subscriber would then be configured to process this information to determine whether they should be sending charging information to the online charging function and whether they should be sending charging information to the offline charging function, and the applicable address or addresses.

A7. The IMS network elements providing services to the subscriber then send charging information to the charging function(s) accordingly.

As an alternative to the above approach, the charging function information included within the subscriber profiles stored in and provided by HSS could be extended to define a number of charging function profiles, each profile defining the address(es) of the charging function(s) to be used for that profile. The charging function information would then also be extended to identify which charging function profile(s) should be applied by each type of IMS network element that provides services to the subscriber. By defining different charging function profiles and defining the types of network elements at which each of these profiles are applied, it is possible to instruct different network elements to apply different charging policies.

By way of example, the charging function information within the subscriber profiles could take the form:

Profile 1: Primary ECF=10.0.0.1, Secondary ECF=10.0.0.2, Primary CCF=10.0.1.1, Secondary CCF=10.0.1.2

Profile 2: Primary ECF=None, Secondary ECF=None, Primary CCF=10.0.3.1, Secondary CCF=10.0.3.2

Profile 3: Primary ECF=192.168.0.1, Secondary ECF=192.168.0.2, Primary CCF=None, Secondary CCF=None P-CSCF=Profile 2
I-CSCF=None
S-CSCF=Profile 1
AS=Profile 3
MRFC=None
BGCF=Profile 2
MGCF=Profile 2
IBCF=Profile 2

In this example, the subscriber profile defines three charging function profiles. The first charging function profile (Profile 1) defines primary and secondary addresses for both the online charging function (i.e. ECF) and the offline charging function (i.e. CCF). The second charging function profile (Profile 2) defines primary and secondary addresses for the offline charging function, and does not include an address for the online charging function. The third charging function profile (Profile 3) defines primary and secondary addresses for the online charging function, and does not include an address for the offline charging function. The charging function information within the subscriber's profile also defines that the P-CSCF, AS, BGCF, MCGF and IBCF should apply the second charging function profile, and therefore that each of these network elements should apply only offline charging. Similarly, the charging function information defines that the S-CSCF should apply the first charging function profile, and therefore that the S-CSCF should apply both offline and online charging, and that the AS should apply the third charging function profile, and therefore that the AS should apply only online charging. Of course, this is just an example, and any viable combination of charging function profiles can be defined for a particular subscriber.

To implement this approach, the HSS is configured to store the extended/additional charging function information of each subscriber within the subscriber's profile, and to provide this additional charging function information to an S-CSCF that has been allocated to the subscriber. This additional charging function information would be provided to the S-CSCF in an extended Charging-Information AVP, which would be included within a SAA message, sent in response to receipt of a Server-Assignment-Request (SAR) message, or within a PPR message.

Upon receipt of a message from the HSS including the additional charging function information, the S-CSCF would be configured to process this message in order to determine the profile that each type of IMS network element should be applying. The S-CSCF then notifies each of the IMS network elements providing services to the subscriber of the details of the charging functions that they should be sending charging information to, in accordance with the charging function information. For example, for those types of network element that are to apply the first charging function profile, the S-CSCF will only include the address(es) from that first charging function profile within the header value of the P-Charging-Function-Addresses header field. For those network elements that are not required to apply a profile, the S-CSCF may not provide any charging function information. However, in some circumstances it may be necessary to provide charging function information to a network element that is not required to provide any charging information, such that that network element may be can forward that charging function information to another network element.

Alternatively, the S-CSCF may be configured to include all of the subscriber's charging function information, received from the HSS, in the P-Charging-Function-Addresses header field of the messages sent to the IMS network elements involved in charging. Each of the IMS network elements providing services to the subscriber would then be configured to process this information to determine which charging function profile they should apply for the subscriber, and therefore whether they should be sending charging information to the online charging function and whether they should be sending charging information to the offline charging function, and the applicable address or addresses.

As a further alternative, the charging function information included within the subscriber profiles stored in and provided by HSS could simply be extended to define a number of charging function profiles, each profile defining the address (es) of the charging function(s) to be used for that profile. The charging function information for a subscriber, including these profiles, would then be provided to an S-CSCF serving the subscriber, which would in turn provide this information to each of the other IMS network elements providing services to the subscriber. Each of the IMS network elements would also be configured with an identity for the charging function profile that should be used by that IMS network element, and would be configured to process the charging function information to identify the appropriate profile. The IMS network elements would then use the charging function address(es) provided within the identified profile.

Figure 5:
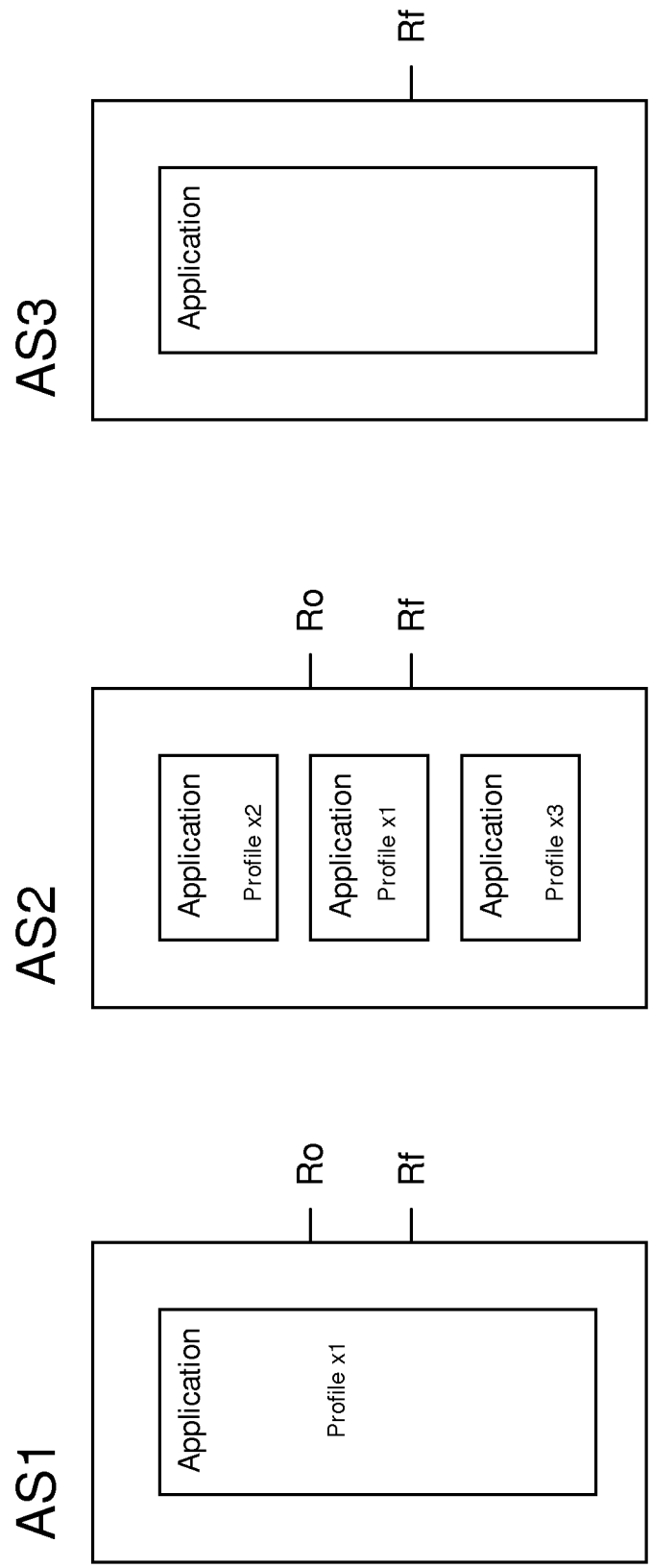
FIG. 5 illustrates schematically an example of Application Servers within an evolved IP Multimedia Subsystem.

The above approaches would also be applicable in an evolved IMS, in which there may be a number of Application Servers involved in a session, with each AS supporting one or more applications. For example, FIG. 5 illustrates an example of three Application Servers (AS) that may be deployed in an evolved IMS. In this example, AS1 provides only a single application and applies the first charging function profile to this application session, whereas AS2 provides support for three different applications. The first of the three applications provided by AS2 applies the second charging function profile, the second of these application applies the first charging function profile, and the third of these application applies the third charging function profile. AS3 provides only a single application and applies the only offline charging. In this case, the subscriber profiles stored at the HSS, and provided to the S-CSCF, would be extended to specify the charging function profile that should be applied by each application. The S-CSCF would then send this information to the individual application servers, either as a whole or having been processed to be IMS network element specific, and the ASs would be able to process the information to determine which profile should be applied for which application.

In addition, if all of the charging function information is provided to the IMS network elements providing services to a subscriber, the above approaches can also provide backward compatibility with IMS network elements that cannot process the additional charging function information. For example, if the additional charging function information comprised, for each type of IMS network element, an indication as to whether charging information should be sent to the online charging function, the offline charging function, both or neither (e.g. as per Table 1), an IMS network element that could not process this additional information could simply make use of the charging function address information in accordance with the current 3GPP standards (e.g. in accordance with their local configuration). By way of further example, if the additional charging function information comprised a number of charging function profiles and, for each type of IMS network element, an indication as to which profile should be applied by that type of IMS network element, an IMS network element that could not process this additional information could simply make use of the charging function address information included within the first profile in accordance with the current 3GPP standards.

Figure 6:
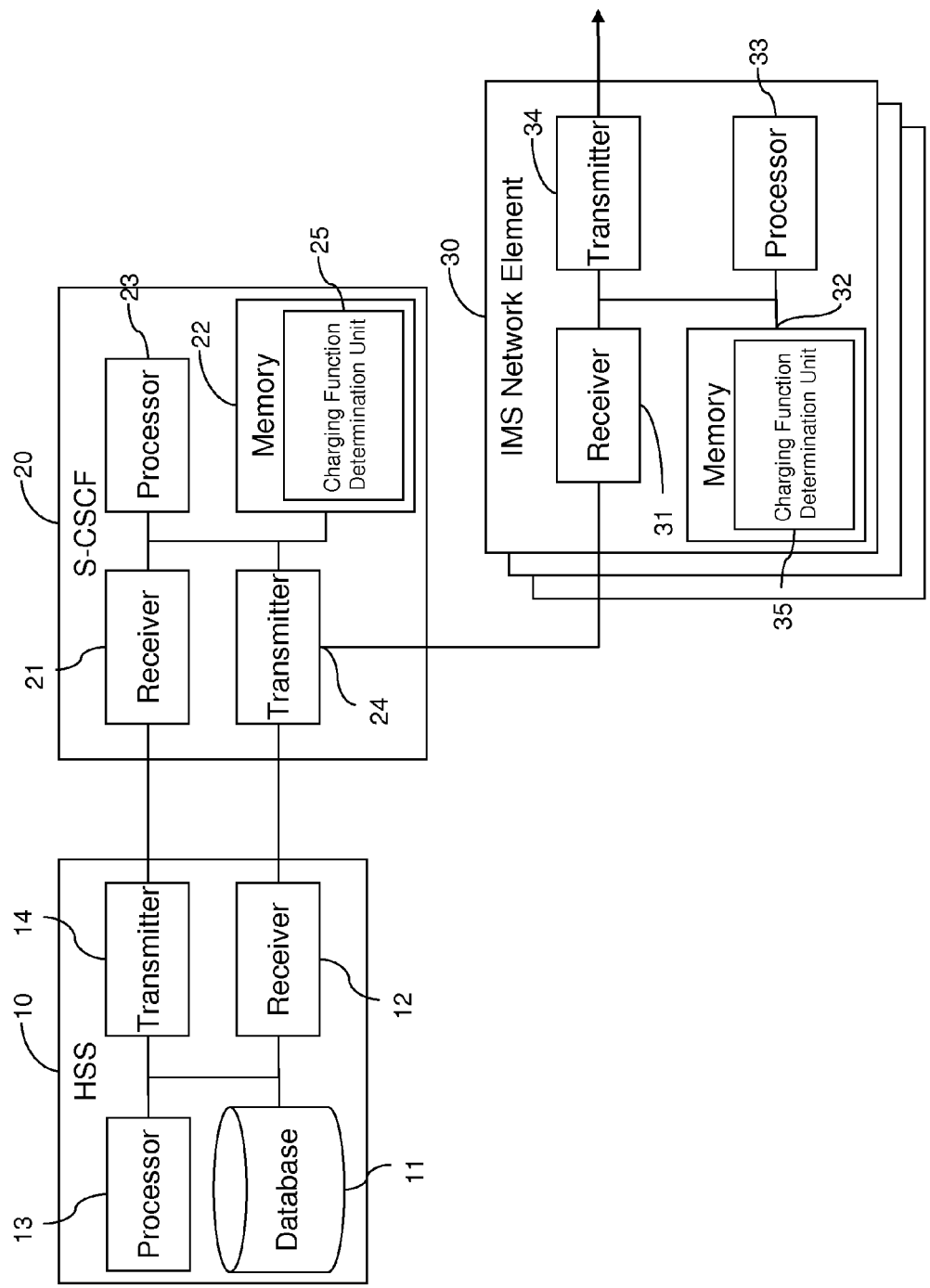
FIG. 6 illustrates schematically various components of an IP Multimedia Subsystem.

FIG. 6 illustrates schematically various components of an IP Multimedia Subsystem suitable for implementing the methods outlined above. Each of these components can be implemented as a combination of computer hardware and software. The HSS 10 comprises a database 11, a receiver 12, a processor 13 and a transmitter 14. The database 11 stores the subscriber profiles, including the additional charging information. The receiver 12 can receive a message from an S-CSCF. For example, the S-CSCF may send a notification of the registration of a subscriber. The processor 13 retrieves a subscriber's profile from the database, which can then be sent to the S-CSCF using transmitter 14.

The S-CSCF 20 comprises a receiver 21, a memory 22, a processor 23 and a transmitter 24. The receiver 21 can receive a message from the HSS including the charging function information of a subscriber to which the S-CSCF 20 is providing services. The memory 22 stores the various programmes that are implemented by the processor 23. The programmes stored in the memory include a charging function determination unit 25. The charging function determination unit 25 can determine the charging policy to be applied by each type of IMS network element providing services to the subscriber. The transmitter 24 is used to forward the charging function information to each of the IMS network elements providing services to the subscriber, or to notify each of the IMS network elements of the charging function addresses determined by the S-CSCF 20 as being applicable to that IMS network element.

The IMS network elements 30 comprise a receiver 31, a memory 32, a processor 33 and a transmitter 34. The receiver 31 can receive a message including the charging function information of a subscriber to which the IMS network element 30 is providing services. The memory 32 stores the various programmes that are implemented by the processor 33. The programmes stored in the memory include a charging function determination unit 35. The charging function determination unit 35 can determine the charging policy to be applied by the IMS network element. The transmitter 24 is used to forward the charging information of the subscriber to the charging function address(es) provided for that IMS network element in the subscriber's charging function information.

The above methods provide that each of the IMS network elements that provide charging information can be individually instructed as to the charging policies they should apply for a particular subscriber. In doing so, the present invention provides fully flexible IMS charging such that the individual IMS network elements can apply different charging policies for a particular user.

It will be appreciated by the person of skill in the art that various modifications may be made to the above-described embodiments without departing from the scope of the present invention. For example, whilst the above-described embodiments refer to a number of specific network elements, these embodiments are equally applicable to any other relevant network elements and, in particular, to any of the network elements referred to in 3GPP TS 32.260.

TABLE 1

| Network Element | Online | Offline |
| --- | --- | --- |
| P-CSCF |   | X |
| I-CSCF |   |   |
| S-CSCF | X |   |
| AS | X |   |
| MRFC |   |   |
| MGCF |   | X |
| BGCF |   | X |
| IBCF |   | X |

The invention claimed is:

1. An apparatus configured to operate as a Serving Call Session Control Function, S-CSCF, within an IP Multimedia Subsystem, IMS, the apparatus comprising:
a receiver configured to receive charging function information for a subscriber, the charging function information including a number of charging function profiles, each charging function profile defining one or more addresses of the one or more charging functions to be used for that charging function profile, each charging function profile specifying whether an IMS network element should send charging information for the subscriber to an offline charging function and whether an IMS network element should send charging information for the subscriber to an online charging function, wherein the charging function information further comprises, for each type of IMS network element, an indication as to which of the addresses the type of IMS network element should use to send charging information for the subscriber and an identification of the charging function profile that should be applied by an IMS network element of that type for the subscriber, and wherein the one or more addresses of an offline charging function and one or more addresses of an online charging function are included within the plurality of charging function profiles;
a processor configured to generate messages distributing the charging function information to the IMS network elements providing services to the subscriber; and
a transmitter configured to send the messages to the IMS network elements providing services to the subscriber.

2. The apparatus as claimed in claim 1, wherein the received charging function information for the subscriber further includes an indication of a plurality of IMS network element types that may be used to provide services to the subscriber and, for each of the plurality of IMS network element types, which one or more charging function profiles should be applied by each of the type of IMS network element that provides service to the subscriber.

3. The apparatus as claimed in claim 1, wherein the received charging function information further specifies the charging function profile that should be applied by each of a plurality of applications supported by an application server.

4. The apparatus as claimed in claim 1, wherein the distributing the charging function information to the IMS network elements further comprises:
sending the charging function information to each of the IMS network elements being used by the subscriber.

5. The apparatus as claimed in claim 1, wherein the charging function information comprises:
one or more addresses of an offline charging function and one or more addresses of an online charging function.

6. A method of operating a Serving Call Session Control Function, S-CSCF, within an IP Multimedia Subsystem, IMS, the method comprising:
receiving charging function information for a subscriber, the charging function information including a number of charging function profiles, each charging function profile defining the one or more addresses of the one or more charging functions to be used for that charging function profile, each charging function profile specifying whether an IMS network element should send charging information for the subscriber to an offline charging function and whether an IMS network element should send charging information for the subscriber to an online charging function, wherein the charging function information further comprises, for each type of IMS network element, an indication as to which of the addresses the type of IMS network element should use to send charging information for the subscriber and an identification of the charging function profile that should be applied by an IMS network element of that type for the subscriber, and wherein the one or more addresses of an offline charging function and one or more addresses of an online charging function are included within the plurality of charging function profiles;
generating messages distributing the charging function information to the IMS network elements providing services to the subscriber; and
sending the messages to the IMS network elements providing services to the subscriber.

7. The method as claimed in claim 6, wherein the received charging function information for the subscriber further includes an indication of a plurality of IMS network element types that may be used to provide services to the subscriber and, for each of the plurality of IMS network element types, which one or more charging function profiles should be applied by each of the type of IMS network element that provides service to the subscriber.

8. The method as claimed in claim 6, wherein the received charging function information further specifies the charging function profile that should be applied by each of a plurality of applications supported by an application server.

9. The method as claimed in claim 6, wherein the step of distributing the charging function information to the IMS network elements further comprises:
sending the charging function information to each of the IMS network elements being used by the subscriber.

10. The method as claimed in claim 6, wherein the charging function information comprises:
one or more addresses of an offline charging function and one or more addresses of an online charging function.

11. An apparatus configured to operate as a subscriber profile server within an IP Multimedia Subsystem, IMS, the apparatus comprising:
a database configured with subscriber profiles each of which includes charging function information for the subscriber, the charging function information including a number of charging function profiles, each charging function profile defining the one or more addresses of the one or more charging functions to be used for that charging function profile, each charging function profile specifying whether an IMS network element should send charging information for the subscriber to an offline charging function and whether an IMS network element should send charging information for the subscriber to an online charging function, wherein the charging function information further comprises, for each type of IMS network element, an indication as to which of the addresses the type of IMS network element should use to send charging information for the subscriber and an identification of the charging function profile that should be applied by an IMS network element of that type for the subscriber, and wherein the one or more addresses of an offline charging function and one or more addresses of an online charging function are included within the plurality of charging function profiles; and
a transmitter configured to send the charging function information of a subscriber to a Serving Call Session Control Function, S-CSCF, allocated to the subscriber.

12. The apparatus as claimed in claim 11, wherein the sent charging function information for the subscriber further includes an indication of a plurality of IMS network element types that may be used to provide services to the subscriber and, for each of the plurality of IMS network element types, which charging function profile(s) should be applied by each of the type of IMS network element that provides service to the subscriber.

13. The apparatus as claimed in claim 11, wherein sent the charging function information further specifies the charging function profile that should be applied by each of a plurality of applications supported by an application server.

14. The apparatus as claimed in claim 11, further comprising:
a receiver configured to receive a notification of the registration of a subscriber from the S-CSCF; and
a processor configured to retrieve the subscriber's charging function information from the database.

15. The apparatus as claimed in claim 11, wherein the subscriber profile server is a Home Subscriber Server.

16. A method of operating a subscriber profile server within an IP Multimedia Subsystem, IMS, the method comprising:
configuring the subscriber profile server with subscriber profiles each of which includes charging function information for the subscriber, the charging function information including a number of charging function profiles, each charging function profile defining the one or more addresses of the one or more charging functions to be used for that charging function profile, each charging function profile specifying whether an IMS network element should send charging information for the subscriber to an offline charging function and whether an IMS network element should send charging information for the subscriber to an online charging function, wherein the charging function information further comprises, for each type of IMS network element, an indication as to which of the addresses the type of IMS network element should use to send charging information for the subscriber and an identification of the charging function profile that should be applied by an IMS network element of that type for the subscriber, and wherein the one or more addresses of an offline charging function and one or more addresses of an online charging function are included within the plurality of charging function profiles; and
sending this charging function information for a subscriber to a Serving Call Session Control Function, S-CSCF, allocated to the subscriber.

17. The method as claimed in claim 16, wherein the sent charging function information for the subscriber further includes an indication of a plurality of IMS network element types that may be used to provide services to the subscriber and, for each of the plurality of IMS network element types, which charging function profile(s) should be applied by each of the type of IMS network element that provides service to the subscriber.

18. The method as claimed in claim 16, wherein sent the charging function information further specifies the charging function profile that should be applied by each of a plurality of applications supported by an application server.

19. The method as claimed in claim 16, wherein the subscriber's charging function information is sent to the S-CSCF in response to receipt of a notification of the registration of the subscriber from the S-CSCF.

20. The method as claimed in claim 16, wherein the subscriber profile server is a Home Subscriber Server.

* * * * *